Figure 1:
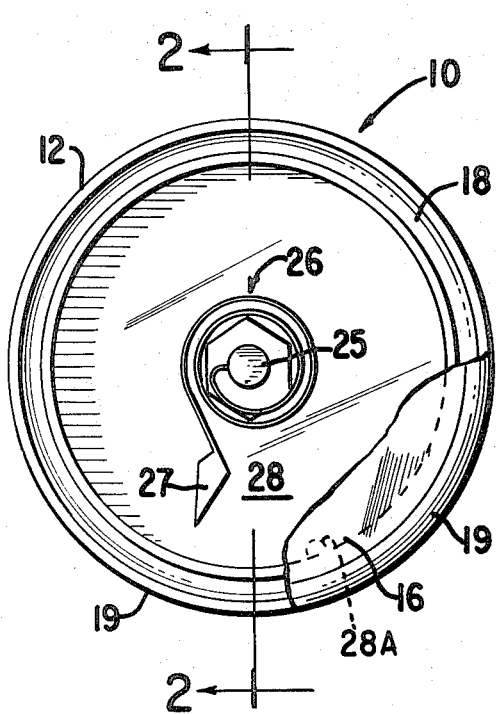

United States Patent [19]
Blough, Jr.

[11] 3,803,918
[45] Apr. 16, 1974

[54] PRESSURE GAUGE ASSEMBLY

[75] Inventor: Jacob M. Blough, Jr., Quakertown, Pa.

[73] Assignee: Ametek, Inc., New York, N.Y.

[22] Filed: Dec. 6, 1972

[21] Appl. No.: 312,663

[52] U.S. Cl............... 73/420, 73/418, 73/431, 116/129 R
[51] Int. Cl............................................. G01l 7/04
[58] Field of Search ............ 73/418, 411, 420, 431, 73/368.6, 368.4; 116/DIG. 23, DIG. 37, 129 R

[56] References Cited
UNITED STATES PATENTS

| 3,213,688 | 10/1965 | Huston | 73/418 |
| 3,222,933 | 12/1965 | Howard | 73/418 |
| 3,641,820 | 2/1972 | Bissell | 73/418 |

Primary Examiner—Donald O. Woodiel
Attorney, Agent, or Firm—Smythe & Moore

[57] ABSTRACT

The pressure gauge of the Bourdon tube type, especially useful for fire extinguishers, has a tubular connection extending from a back plate closing one end of the casing. A socket has a barbed end snugly received within the bore of the connection and the other end projecting into the casing. A normally bowed dial plate disc is mounted on the socket and has its outer edge resting upon the edge of the inner face of the back plate when the socket is positioned in the bore of the connection. The socket is seated against the back plate so that the dial plate disc is substantially straight.

12 Claims, 2 Drawing Figures

PATENTED APR 16 1974

3,803,918

PRESSURE GAUGE ASSEMBLY

This invention relates to pressure gauges and particularly gauges for use in conjunction with fire extinguishers to indicate the condition of the contents.

Low cost, lightweight fire extinguishers have been provided with pressure gauges of the Bourdon tube type in order to give an indication of the charging pressure of the fire extinguisher. As long as the charging pressure remains within a certain predetermined range, the fire extinguisher will be operable. While such gauges are preferably small and inexpensive, they must be strongly constructed and reliable in operation so that an accurate determination of the condition of the extinguisher can be quickly made. Further, the gauge must be of sufficient strength to withstand occasional rough usage and handling of the fire extinguisher. The indicator in such gauges generally comprises a pointer on the closed end of a Bourdon tube with the pointer moving over indicia on a dial face in response to the pressure as sensed by the Bourdon tube. The other end of the Bourdon tube is mounted and sealed onto a post or connection extending from the closed end of the cylindrical casing of the gauge. The dial face is generally not a structural component of the gauge movement since it performs only an indicating function in conjunction with the pointer. Such dial faces have either been mounted on the Bourdon tube socket or have been positioned independently within the casing. Considerable problems have been encountered in mounting the socket within the cylindrical connection post in a manner which is simple to fabricate, inexpensive in construction, but which will provide a tight and secure mounting of the socket within the connection.

One of the objects of the present invention is to provide a simple and relatively inexpensive structure for securing the socket within the casing of a Bourdon tube type pressure gauge in conjunction with the dial face.

According to one aspect of the present invention, a pressure gauge, such as is useable for fire extinguishers, may comprise a casing having a cylindrical sidewall and a back plate closing one end of the casing. At least a portion of the inner face of the back plate can be concave shaped. A connection extends outwardly from the back plate and a bore is formed through the back plate and connection to provide a passage from the interior of the casing. A socket has one end snugly received within the bore and the other end projecting into the casing. A dial face is rotatably mounted on the socket and has its outer peripheral edge resting upon the peropheral edge of the back plate inner face when the socket is positioned in the bore.

Other objects, advantages and features of the present invention will be apparent from the accompanying descriptions and drawings, which are merely exemplary.

Figure 2:
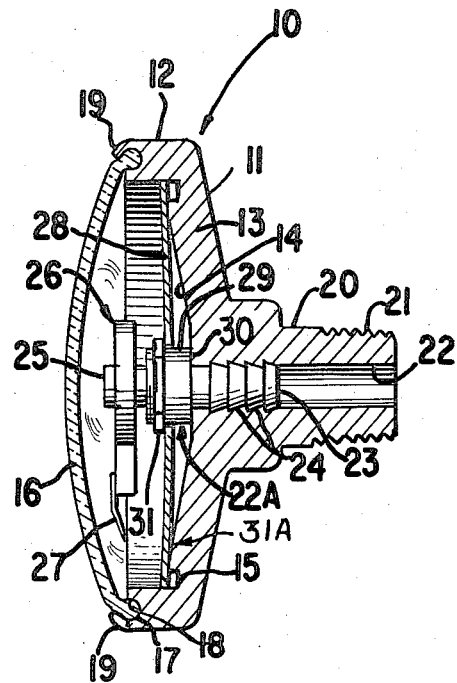

In the drawings:

FIG. 1 is a front elevational view of a pressure gauge incorporating the present invention with a portion of the viewing window being removed; and FIG. 2 is a longitudinal sectional view taken along the line 2—2 of FIG. 1.

Proceeding next to the drawings wherein like reference symbols indicate the same parts throughout the various views, a specific embodiment of the present invention will be described in detail.

A pressure gauge incorporating the present invention is indicated generally at 10 in FIGS. 1 and 2 comprising a casing 11 having a cylindrical sidewall 12 closed by a rear wall or back plate 13 whose inner face 14 is slightly concave shaped as can be seen in FIG. 2. A peripheral groove 15 extends around the perimeter of the inner face 14.

The other end of the cylindrical casing 12 is closed by a transparent viewing window 16. In the form showing, the outer peripheral edge is provided with a beaded flange 17 received within an annular groove 18 in the open end of cylindrical wall 12. The outer edge of the casing indicated at 19 is bent over as shown in FIG. 2 to retain the viewing window in position as described in more detail in copending application Ser. No. 208,647 filed Dec. 16, 1971. Other types of closures can be used.

A cylindrical support post or connection 20 having a threaded exterior portion 21, extends outwardly from the outer face of back plate or wall 13. A bore 22 extends through the back plate 13 and connection 20 to provide a passage.

A cylindrical socket 22A has an end 23 thereof provided with a series of annular notches 24 so as to form a series of annular barbs, and this barbed end is inserted into the bore 22 from the interior of the casing to be snugly received therein. One or more barbs can be used. A suitable adhesive, such as "Loctite," a trademark of Loctite Corporation for an anerobic adhesive, can be applied to this barbed end to form a permanent and secure connection, such as discussed in copending application Ser. No. 208,647, filed Dec. 16, 1971.

The other end of the socket indicated at 25 is provided with a pressure indicator in the form of a Bourdon tube 26 which has one end connected to the socket so as to communicate therewith. The Bourdon tube 26 can have a relatively flat tubular cross section with a pointer 27 at its outer closed end which extends at substantially right angles to the Bourdon tube. The pointer may be constructed of a bendable material so as to be adjustable with respect to the Bourdon tube.

The pointer 27 moves over a dial face formed on a dial face plate 28 which is in the form of a flat disc. The dial plate 28 is located on an enlarged diameter portion 29 on the socket which forms a shoulder 30. The enlarged diameter portion 29 bottoms against the inner face 14 of the back plate when the socket is assembled as shown in FIG. 2.

When the socket is mounted, as shown in FIG. 2, dial plate 28 will be bowed or flexed inwardly so as to be frictionally held between the shoulder 31 and the inner face 14 at the zone 31A of the casing 13. The peripheral edge of the plate 28 will rest substantially on the inner edge of the annular groove 15 formed in the inner face 14 of the back plate so that it can be turned relative thereto for calibrating or adjustment. Annular recess 15 serves to permit insertion of a tool point for rotating the dial. It also is possible to use an initially bowed dial plate. The location of shoulder 30 relative to the back plate 14 and the depth of the enlarged portion 22A will govern the amount of concavity of plate 28 when assembled.

The casing comprising the cylindrical side wall 12 and back plate 13 together with the connection 12 may be formed in a single unitary structure. This casing structure may be made of a relatively soft metal such as aluminum. The socket may be formed of a harder metal such as brass so that the barbed end of the socket will become embedded in the sfoter metal of the casing. Aperture 28A can be formed in plate 28 so that a tool can be inserted thereon to rotate the plate.

The assembly of the pressure gauge according to the present invention is a relatively simple procedure since the casing comprises one unit and the socket, dial face and pointer comprising a second unit. These two units are easily assembled in the manner described above and the open face of the casing is then closed by the viewing window as previously described.

It will be understood that various details of constructions and arrangement of parts may be made without departing from the spirit of the invention except as defined in the appended claims.

What is claimed is:

1. In a gauge, the combination of a casing having a cylindrical sidewall and a closed back portion, a connection extending outwardly from said back plate and there being a bore through said back plate and connection to provide a passage from the interior of the casing, a socket having one end snugly received within said bore and the other end projecting into said casing, a condition responsive gauge movement on the end of the socket within the casing, and a dial plate rotatably mounted on said socket and having its outer peripheral edge resting upon the back plate inner face adjacent the peripheral edge of said back plate when the socket is positioned in said bore.

2. A gauge as claimed in claim 1 wherein said dial plate is made of a thin resilient material.

3. A gauge as claimed in claim 2 wherein the thin material is metal.

4. A gauge as claimed in claim 1 wherein said socket one end has at least one annular notch thereon to define a barbed end.

5. A gauge as claimed in claim 4 and including an adhesive on said barbed end of the socket.

6. A gauge as claimed in claim 4 wherein there are a plurality of annular notches.

7. A gauge as claimed in claim 1 including a shoulder on said socket positioned against the inner face of the back plate when the socket is in position and the peripheral inner edge of the dial plate.

8. A gauge as claimed in claim 1 wherein there is a peripheral groove in the inner face of said back plate.

9. A gauge as claimed in claim 8 wherein said dial plate rests on the inner edge of said peripheral groove and there is an aperture in the dial plate for receiving an adjusting tool.

10. A gauge as claimed in claim 1 and including a pressure responsive indicator movement on the end of the socket within the casing.

11. A gauge as claimed in claim 1 wherein said casing and connection are a unitary structure.

12. A gauge as claimed in claim 1 wherein said casing and socket are of metal with one of the metals being softer than the other.

* * * * *